May 25, 1965 W. HOFMEISTER 3,185,266
METHOD FOR CONNECTING AND SEALING SHEET-METAL PARTS
Filed Oct. 6, 1959 2 Sheets-Sheet 1
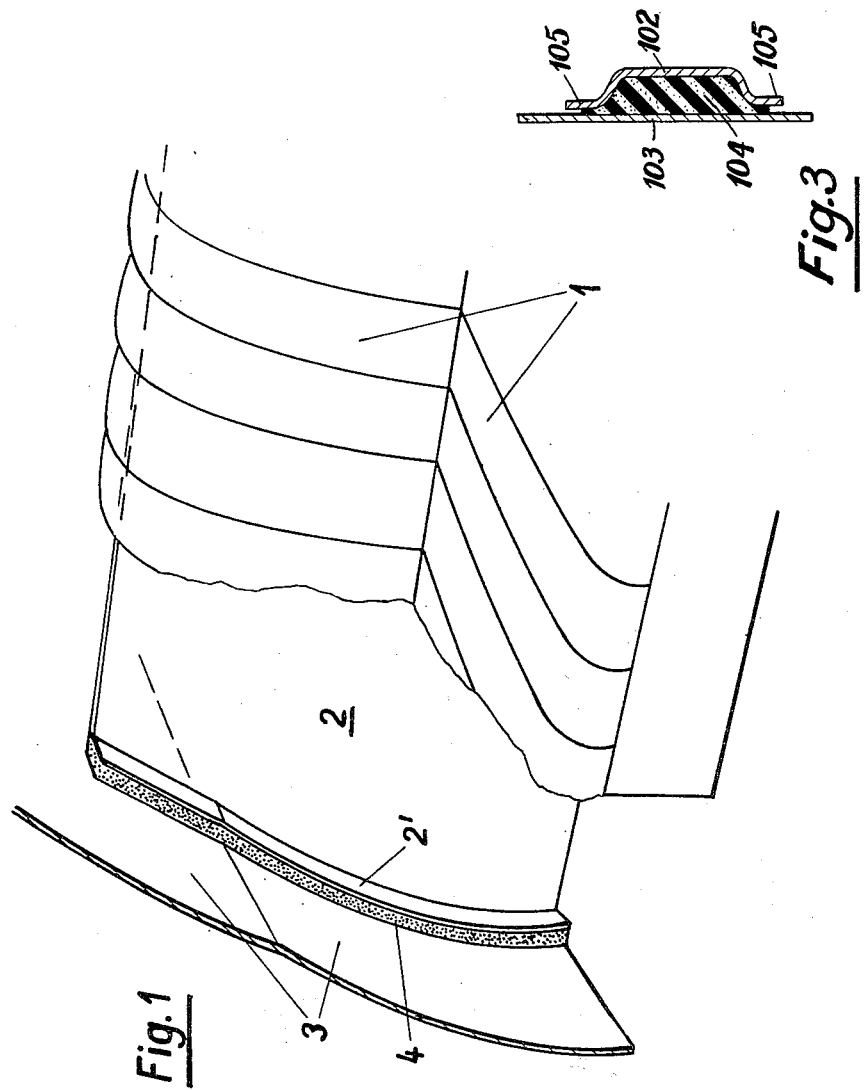
INVENTOR
WILHELM HOFMEISTER
BY Dicke, Craig & Freudenberg
ATTORNEYS May 25, 1965   W. HOFMEISTER   3,185,266
METHOD FOR CONNECTING AND SEALING SHEET-METAL PARTS
Filed Oct. 6, 1959   2 Sheets-Sheet 2
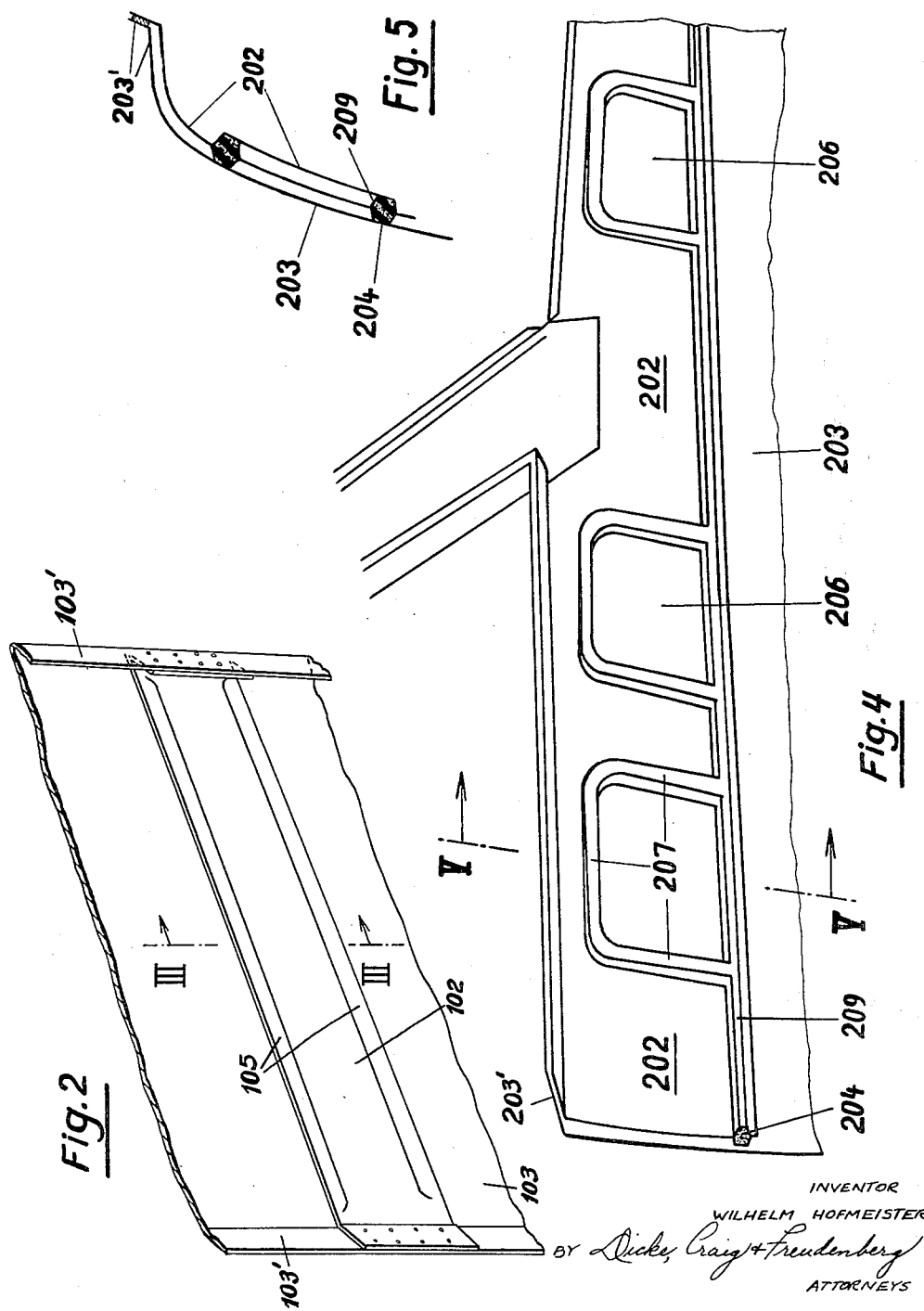
INVENTOR
WILHELM HOFMEISTER
BY Dicke, Craig & Freudenberg
ATTORNEYS

United States Patent Office 3,185,266
Patented May 25, 1965

3,185,266
METHOD FOR CONNECTING AND SEALING SHEET-METAL PARTS
Wilhelm Hofmeister, Munich, Germany, assignor to Bayerische Motoren Werke, Munich, Germany
Filed Oct. 6, 1959, Ser. No. 844,753
7 Claims. (Cl. 189—34)

The present invention relates to a method for producing a connection and seal of sheet-metal body parts at motor vehicles, especially of those sheet-metal parts which are connected with the outer covering of the vehicle body whereby the connecting surfaces of the sheet-metal parts are arranged at a distance from each other and the space thus formed therebetween is filled with an elastic material vulvanized thereto.

In the known connections of sheet-metal parts by means of spot welding, which is most commonly used, a damage to the smooth sheet-metal surface is unavoidable. To this disadvanttage has to be added the fact that indented or buckled portions, i.e., pressed-in and pressed-out or bulging surfaces are produced in the surfaces of the sheet-metal parts already with slight inaccuracies in the dimensions of the sheet-metal parts. In order to achieve at the visible surfaces, especially at the outer covering of the vehicle body, a smooth upper outer surface as well as a tightness of the connection, the original shape of the surfaces has to be reproduced and/or tightness of the connection has to be realized by the use of soldering in expensive subsequent refinishing and dressing operations, for example, by flushing with tin, and by filling and polishing the surfaces.

These disadvantages have already been removed far-reachingly in known prior art connections of sheet-metal parts utilizing soft rubber strips or cross-sectional profiles vulcanized into place under pressure and heat. However, the realization of this prior art method requires a considerable expenditure in dies in the form of pressure frames matched or conformed to the particular shape of the body part and also necessitates a configuration of the connecting surfaces which has to be as accurately parallel as possible. The latter is particularly important with these known prior art connections because otherwise the elastic soft rubber profiles either do not stick over the entire length of the connecting area at the connecting surfaces or because a local deformation of the sheet-metal surfaces might be caused as a result of internal stresses thereof. By reason of these difficulties, this type of connection known to the prior art did not find widespread acceptance.

The present invention is concerned with the problem to eliminate all of these difficulties encountered in the prior art and to provide a method which may be realized in the simplest manner without making special requirements as to the parallel contour of the connecting surfaces. The present invention especially consists in a method to which a profile member or strip prepared for the vulcanization thereof and made of an unvulcanized rubber mixture is inserted between the connecting surfaces suitably prepared for the vulcanization which profile member or strip of unvulcanized rubber has a cross-section corresponding approximately to the spacing and width of the connecting surfaces and which is vulcanized in place by heating the body, for example, during the painting operation when the entire vehicle is subjected to heat produced, for instance, by infra-red lamps to evenly dry the paint, or during any other suitable period of time during manufacture of the vehicle.

Advantageously, a rubber mixture with additives is used so that during vulcanization a considerable increase in the volume thereof takes place by the formation of a foam-like cellular structure. Since additives of this type are well known in the art, a specific listing thereof as to type and amounts used is dispensed with herein. However, it is understood that the amount and type of additives used to produce the desired foaming action resulting in the desired foam-like cellular structure may be selected according to well-known teachings of which the prior art is replete.

The method according to the present invention distinguishes itself with respect to the known prior art methods especially by the surprisingly simple manipulation and ease of handling thereof. It is only necessary in connection therewith to cleanse the connecting surfaces of the sheet-metal parts, to treat the thus cleansed surfaces with a substance enhancing the connection between metal and rubber, and to insert a strip or profile member of unvulcanized rubber mixture between the connecting surfaces arranged at a distance from each other by any suitable simple retaining or holding means or by additional rigid connections of the two sheet-metal parts, for example, at the ends thereof. Further, separate operating steps are not necessary for the realization of the method according to the present invention since the vulcanization takes place thereupon automatically upon heating the entire vehicle body, for example, during the painting operation thereof, i.e., during the paint-drying operation thereof. Of course, the vulcanization may also be realized at any other period of time and/or by merely local heating of the vehicle body in the desired places. Since the unvulcanized rubber mixture which has been shaped advantageously already during the manufacture thereof into a profiled strip corresponding in cross-section approximately to the distance and width of the connecting surfaces is plastically deformable, no special requirements are made of the contour of the connecting surfaces with respect to each other. The distance of the connecting surfaces may pass over, for example, beginning with a spot welded place covered against the outside thereof from the immediate contact of the two connecting surfaces gradually to the desired value, within a very large tolerance, of approximately five to fifteen millimeters of the normal distance between the connecting surfaces. During vulcanization the rubber mixture expands and by reason of its internal stresses squeezes into the narowest aperture, slits, grooves and spaces between the connecting surfaces. A foam-like cellular structure with very small hollow spaces and high rigidity results therefrom. The freely exposed upper surfaces of the vulcanized rubber mixture is closed and may be covered with varnish or lacquer. Moreover, even the coating with lacquer prior to vulcanization does not impair the quality of the connection. For special connecting purposes, for example, in connection with detachable sheet-metal parts, it may also be advantageous to vulcanize the rubber mixture as sealing element only on one side thereof. For that purpose it is only necessary to pretreat one of the sheet-metal parts in such a manner that no rubber-metal connection can take place.

The connection of body sheet-metal parts realized by the method in accordance with the present invention distinguishes itself in particular by the noise-absorbing or noise-damping effectiveness thereof. Consequently, the connection in accordance with the present invention is particularly suitable also for the support of additional reinforcing sheet-metal parts at vehicle body members of relatively large surface, especially at the outer body covering thereof, whereby auto-vibrations of these sheet-metal parts causing droning noises are effectively damped. It is proposed in accordance with the present invention for the construction of such a reinforcing sheet-metal part disposed at the inside of the vehicle outer body covering to secure the reinforcing sheet-metal part at least along one of the rim portions thereof or at other places thereof by spot welding or by any other suitable connections providing a rigid connection at a vehicle body part and to support the reinforcing sheet-metal part at the outer body covering or at another sheet-metal part by means of strips of vulcanized rubber mixture disposed in essentially U-shaped indentations or pressed-out portions provided in these parts. By the use of such an arrangement, the internal stresses in the rubber mixture produced during the vulcanization may be utilized far-reachingly for clamping the reinforcing sheet-metal part against the supporting sheet-metal part. Consequently, the effect thereof suppressing droning noises is further enhanced.

Accordingly, it is an object of the present invention to provide a method for achieving a sealing connection between two sheet-metal parts which is simple in nature, which may be readily realized in practice by simple means, and which is also relatively inexpensive.

Another object of the present invention is the provision of a method for achieving a connection between sheet-metal parts which does not impair the appearance of the outer surfaces of the sheet-metal parts as would be the case with the use of spot welded connections requiring expensive and time-consuming refinishing operations in order to reestablish the original smooth outer surface thereof.

Another object of the present invention is the provision of a connection between sheet-metal parts which requires simple steps in the actual realization thereof and which is relatively inexpensive while at the same time assuring a complete and reliable tightness between the parts by means of appropriate rubber strips.

Still another object of the present invention is the provision of a connection between sheet-metal parts which is not only simple and easy to install but at the same time constitutes an effective sound-absorbing means preventing in particular droning noises caused by vibrations of the relatively large sheet-metal parts used in connection with the vehicle outer covering wall.

These and other objects, features and advantages of the present invention will become more obvious from the following description, when taken in connection with the accompanying drawing which shows, for purposes of illustration only, several embodiments in accordance with the present invention and wherein:

FIGURE 1 is a perspective view, partly in cross-section with parts removed for purposes of clarity, of a vehicle body transverse wall secured to the vehicle outer body wall by the use of the method in accordance with the present invention, FIGURE 2 is a partial perspective view of the arrangement of a reinforcing sheet-metal member at the smooth sheet-metal part of the vehicle outer body covering, FIGURE 3 is a cross-sectional view taken along line III—III of FIGURE 2, FIGURE 4 is a partial perspective view of a modified embodiment of an arrangement of reinforcing sheet-metal members secured to the vehicle body in accordance with the present invention, and FIGURE 5 is a cross-sectional view taken along line V—V of FIGURE 4.

Referring now to the drawing wherein like reference numerals are used throughout the various views to designate corresponding parts, though corresponding reference numerals of the 100 series are used for the embodiment of FIGURES 2 and 3 and corresponding reference numerals of the 200 series for the embodiment of FIGURES 4 and 5, and more particularly to FIGURE 1, reference numeral 2 designates a back rest sheet-metal member inserted in the vehicle interior space behind the seat or seating bench of the vehicle. The back rest sheet-metal member 2 is laterally supported thereby at the vehicle outer covering 3 of the body. For purposes of connecting the back rest sheet-metal member 2 with the outer covering 3 of the vehicle body, the former is provided with an angularly bent rim portion 2' which extends along the contour of the outer covering 3 at a predetermined distance therefrom. After cleansing and preparation of the connecting surfaces of the sheet-metal members 2' and 3 for purposes of vulcanization, a strip 4 made of unvulcanized rubber mixture is inserted between the two connecting surfaces of the sheet-metal members 2 and 3 and bonded by vulcanization to both of these surfaces. This takes place in such a manner that after removal of grease and/or any other undesirable soiling on the connecting surfaces of the sheet-material members, for example, by the use of suitable grease removing agents such as detergents, etc., the connecting surfaces are covered with an agent or coating preparatory to vulcanization, and after drying thereof a strip of unvulcanized rubber mixture is inserted between the connecting surfaces which are arranged at a corresponding distance. The vulcanization itself may take place without an additional operating step, for example, during heating of the vehicle body in the course of the painting operation whereby a tight connection is produced between the vehicle body sheet-metal parts which additionally possesses the advantage of damping vehicle body vibrations and, furthermore, does not make any high requirements as regards close tolerances as to the shape of the sheet-metal parts, especially as to the contour of the angularly bent rim portion 2' of the back rest 2 and of the outer body covering 3.

In the embodiment of FIGURES 2 and 3 illustrating an arrangement of a reinforcing sheet-metal member at a smooth outer body sheet-metal panel, the reinforcing sheet-metal member 102 is rigidly connected at both ends thereof with the angularly bent end portions 103' of the vehicle body sheet-metal panel 103, for example, by spot welding. The reinforcing sheet-metal member 102 is constructed of approximately U-shaped cross-section within the area of the surface of the smooth vehicle body sheet-metal panel 103 and is provided on both sides thereof with small flangelike extensions 105. The flanged extensions 105 extend at a slight distance from the sheet-metal body panel 103 without, however, touching the same. The space enclosed by the sheet-metal panel 103 and the reinforcing sheet-metal member 102 of essentially U-shaped cross-section which is rigidly secured at both ends thereof with the outer body covering is filled with unvulcanized rubber mixture 104 inserted therein and vulcanized thereto in situ which effects during vulcanization, by the increase in the volume thereof, an internal pressure stress and therewith a clamping or pretensioning of the two sheet-metal parts 102 and 103 with respect to each other. The smooth vehicle sheet-metal body panel 103 is effectively damped in this manner against annoying droning noises caused by self-vibrations.

According to the embodiment illustrated in FIGURES 4 and 5, a reinforcing sheet-metal member 202 is secured, for example, by spot welding at the vehicle outer covering 203 in the upper region 203' thereof. The reinforcing sheet-metal member 202 extends over the entire length approximately at the same distance with respect to the outer covering 203 and is provided near the lower boundary thereof with a U-shaped indentation or pressed-out portion 209 which extends, for example, over the entire length of the reinforcing sheet-metal member 202. A profile strip 204 of unvulcanized rubber mixture is inserted into this indentation 209 which is vulcanized in place by heating of the vehicle body after the reinforcing sheet-metal member 202 is secured at the outer body panel covering 203 within the upper region 203' thereof. During vulcanization, the rubber mixture 204 undergoes an increase in volume which effects a pretensioning or clamping of the sheet-metal members 202 and 203 with respect to each other. As a result thereof, there is achieved a reinforcement of the vehicle body as well as a considerable anti-drone effect, i.e., a decrease in droning, by damping the auto-vibrations of the vehicle body covering. The reinforcing sheet-metal member 202 may be provided with additional U-shaped indentations 207, for example, arranged parallel to the rim portions of the indentations 206 which may also be provided with profile strips made of a rubber mixture to be vulcanized in place whereby the support or abutment of the two sheet-metal members 202 and 203 with respect to each other is distributed over larger surfaces.

While I have shown and described several embodiments in accordance with the present invention, it is understood that the same is not limited thereto but is susceptible of many changes and modifications within the spirit and scope of the present invention.

In connection therewith, any suitable cleaner or grease-removing agent such as, for example, benzine may be used for the preparation of the sheet-metal connecting surfaces where the connections are to be established. Similarly, any desired material, agent or coating may be used to prepared these surfaces so as to assure either good adhesions of the rubber mixture compound during vulcanization with the sheet-metal surfaces or to minimized and effectively prevent any connection between the rubber compound and the sheet-metal surface in case it is desired to prevent such a connection, for example, in those places where one sheet-metal part is movable with respect to the other and the rubber mixture may serve as seal, for example, along hoods or the like in motor vehicles. The bonding agent has to perform the function, therefore, of holding the rubber strip in place until the latter is vulcanized to the metal parts during vulcanization. A suitable bonding agent is sold under the trade name Terokal R2444 which is a neoprene-base adhesive containing highly volative organic solvent combinations and approximately 33% solids. The specific gravity is 0.8 and it is of medium viscosity and suitable for application by a brush. Additionally, the rubber compound may be prepared in any known manner to give the desired foaming characteristic and provide the desired cellular structure. Any commercially available rubber mixture such as the one sold commercially under the name "Porover BSV" may be used.

Thus, it is obvious that the present invention is susceptible of many changes and modifications within the spirit and scope of the present invention, and I, therefore, do not wish to be limited to the particular embodiments illustrated and described herein but intend to cover all such changes and modifications as are encompassed by the scope of the appended claims.

I claim:

1. A reinforcing body structure for motor vehicles formed by two body sheet metal members of said motor vehicle having a relatively tight, sealing connection therebetween for effectively dampening droning noises, comprising a first sheet metal member forming an outer covering body panel and a second sheet metal member reinforcing said first member and having at least one end portion securely fastened thereat to said first member, said first and second sheet metal members having mutually spaced connecting surfaces of predetermined dimensions arranged in oppositely disposed face-to-face spaced relationship and profile strip having a cross section corresponding essentially to the width and spacing of said opposed connecting surfaces and essentially consisting of a rubber mixture having a foam-like cellular structure in the vulcanized condition, said profile strip being inserted between said spaced connecting surfaces and vulcanized to said spaced connecting surfaces in situ so as to elastically connect said connecting surfaces by said profile strip having said foam-like cellular structure.

2. A structure according to claim 1, wherein said reinforcing member is provided with an essentially U-shaped channel portion, and wherein said strip is contained in said U-shaped channel portion.

3. A structure according to claim 2, wherein said U-shaped channel portion extends over the entire length of said reinforcing member.

4. A method for producing a sealing connection between body sheet metal members of motor vehicles in which the connecting surfaces of the members to be connected with each other are located at a predetermined distance from each other to form a space therebetween adapted to be filled with an elastic material to be vulcanized in place, comprising the steps of cleaning the connecting surfaces of the sheet metal members, securely fastening at least one end of one of said members to the other member to thereby locate said members in fixed spaced relationship with their connecting surfaces facing each other to define said space therebetween, inserting into said space a profiled strip having a cross section corresponding essentially to the spacing and width of the connecting surfaces and consisting of an unvulcanized rubber mixture adapted to undergo a substantial increase in the volume thereof by the formation of a foam-like structure during vulcanization, and finally vulcanizing said strip to the connecting surfaces of said members in situ during the assembly of the vehicle, by a process consisting of the application of heat whereby the vulcanized strip forms an elastic connection between said members.

5. A method according to claim 4, wherein said one member is securely fastened to said other member at places intermediate the ends.

6. A method for producing a sealing connection between sheet metal members of motor vehicles of which one of the sheet metal members is an outer body covering panel and the other is a reinforcing member provided with pressed-in channel portions of approximately U-shaped cross section and having at least one rim portion connected with the outer body covering panel of the vehicle and in which the connecting surfaces thereof are located at a distance from each other to form a space therebetween adapted to be filled with an elastic material to be vulcanized in place, comprising the steps of cleaning the connecting surfaces of said sheet metal members for vulcanization, thereupon inserting into said approximately U-shaped channel portions formed in said reinforcing member a profiled strip made of unvulcanized rubber mixture adapted to undergo a substantial increase in the volume thereof by the formation of a foam-like structure during vulcanization, said profiled strip having a width corresponding essentially to the width of said channel portions and a thickness corresponding essentially to the distance existing between the bottom of said channel and said covering panel with said panel and said member in assembled relationship, thereupon securely fastening said reinforcing member with said one rim portion thereof at said body panel thereby locating said outer body panel and said reinforcing member in fixed spaced relationship with their connecting surfaces facing each other to define said space therebetween, and thereafter vulcanizing said strip to the connecting surfaces of said body covering panel reinforcing member in situ by a process consisting of heating during assembly of the vehicle, whereby the vulcanized strip forms an elastic connection between said panel and said reinforcing member.

7. A method according to claim 6, wherein said step of securely fastening includes spot welding.

References Cited by the Examiner

UNITED STATES PATENTS

| | | | |
|---|---|---|---|
| 1,712,965 | 5/29 | Maranville | 154—45.9 |
| 2,106,840 | 2/38 | Gould | 220—9 |
| 2,184,482 | 12/39 | Austin et al. | 154—44.5 |
| 2,230,439 | 2/41 | Shumaker | 296—137 |
| 2,237,623 | 4/41 | Ledwinka | 154—45.9 |
| 2,244,956 | 12/41 | Miller et al. | |
| 2,337,555 | 12/43 | Hosking | 154—130 X |
| 2,420,815 | 5/47 | Cooper et al. | |
| 2,576,698 | 11/51 | Russum | 154—44 X |
| 2,763,586 | 9/56 | Noyes | 154—43 |

ALEXANDER WYMAN, Primary Examiner.

EARL M. BERGERT, CARL F. KRAFFT, Examiners.